United States Patent [19]

Gill et al.

[11] Patent Number: 4,612,595
[45] Date of Patent: Sep. 16, 1986

[54] DC POWER CONTROL SYSTEM

[75] Inventors: Ronald P. Gill, Nashville; Vernon C. Evans, New Athens, both of Ill.

[73] Assignee: Peabody Coal Company, St. Louis, Mo.

[21] Appl. No.: 629,231

[22] Filed: Jul. 9, 1984

[51] Int. Cl.$^4$ .................. H02H 3/00; H02H 7/00; H02H 9/02
[52] U.S. Cl. .................. 361/93; 361/31; 361/59
[58] Field of Search .................. 361/31, 47–50, 361/71–73, 63, 113, 59, 93, 42

[56]  References Cited
U.S. PATENT DOCUMENTS

| | | | |
|---|---|---|---|
| 2,874,337 | 2/1959 | Sorensen | 361/50 |
| 2,991,397 | 7/1961 | Place | 361/42 X |
| 3,066,284 | 11/1962 | McKinley et al. | 361/49 X |
| 3,609,459 | 9/1971 | Thompson | 317/23 |
| 3,946,279 | 3/1976 | Paice et al. | 361/42 |
| 3,975,663 | 8/1976 | Moorey | 361/42 |
| 4,159,501 | 6/1979 | White | 361/42 X |
| 4,296,450 | 10/1981 | Paice et al. | 361/113 X |
| 4,340,920 | 7/1982 | Gill et al. | 361/42 X |
| 4,454,555 | 6/1984 | DeLacy | 361/59 |

Primary Examiner—Patrick R. Slace
Assistant Examiner—Marc S. Hoff
Attorney, Agent, or Firm—Senniger, Powers, Leavitt and Roedel

[57] ABSTRACT

DC power control system for use in an electric vehicular system has DC power supply and power conductors. A meter relay in a control unit enclosure displayably measures the DC current in the conductors and simultaneously establishes an overcurrent limit for tripping out the conductors when the limit is exceeded. Meter calibration and tripping function are testable by a test switch for substituting an adjustable DC test source in place of a conductor meter shunt to the meter relay. Application of DC to shorted power conductors is prevented by preliminary low power DC isolated AC relaying across the conductors. The test switch substitutes a low resistance for the power conductors to also test the AC tripping action. If the power conductors are already energized from a remote power supply, the local power supply is prevented from access by DC responsive relaying during a preliminary time period. After a problem is detected, the control system locks out so as to demand operator attention if the problem persists.

15 Claims, 3 Drawing Figures

DC POWER CONTROL SYSTEM

BACKGROUND OF THE INVENTION

The present invention relates to the field of control systems for direct current (DC) power supplies. More specifically, the present invention relates to DC power control systems and methods using meter relay and AC and DC testing circuitry for overload and reclosure protection of apparatus for providing DC power to high current load systems.

Heretofore rectifier reclosure systems have depended upon the voltage drop across high power load measuring resistors tied into a relay system or magnetic amplifier to detect a potential overload such as between the track and the trolley of an electric vehicular system. These reclosure systems are workable but they are believed to require a high degree of electrical ability and time to trouble shoot and repair, calibrate and adjust. The state of calibration is not believed to be conveniently apparent making scheduled attention necessary, even when the system is functioning properly. Expensive external calibration and repair equipment can be necessary. The economic disadvantages are apparent. In mine vehicular systems, worst case scenarios can occur leading even to safety hazards.

Consequently, DC power control systems of more easily calibrated and testable electrical constructions and more quickly repaired and maintained electrical constructions are of significant interest to the art.

SUMMARY OF THE INVENTION

Among the objects of the present invention are to offer a safer and more dependable means of applying an electrical power voltage to a load; to offer a safer and more dependable means of sensing whether there is an overload or short circuit present prior to permitting connection of the high power direct current voltage power supply to the load; to offer dependable overload protection of the circuitry and components when already providing high power to the load; to offer a dependable means of ensuring that power is not provided to a load already being powered via another source; to offer a dependable method of setting overload and reclosure protection to a desired visually apparent limit; to provide relatively low power a.c. testing for an overload condition; to provide an electric power control system which can be field calibrated in a brief period of time without external equipment to unite the overload tripping and calibration functions in an electric power control system; and to provide an electric power control system having applicability to electric vehicular systems for coal mines and elsewhere, which is more economical in manufacture compared to electric power control systems of the prior art.

In the attainment of these and other objects the inventive electric power control system provides a meter relay means coupled in shunt to one of the DC conductors for displayably measuring the DC current flowing in the conductor. The meter relay includes adjustable apparatus for establishing an overcurrent limit and relaying when the overcurrent limit is exceeded. An adjustable DC relatively low power test source and a test switch for switchably decoupling the meter relay from the conductor and instead connecting the meter relay to the adjustable test source is provided. The test source is sufficiently adjustable so that it causes the meter relay in the test switch mode to display both above and below the overcurrent limit. In this way the DC power control system directly monitors the DC current in at least one conductor and is testable by the test switch and the adjustable test source for proper tripping action at the overcurrent limit by means of the meter relay. The test source also provides convenient field calibration of the meter relay.

In another aspect of the invention, DC isolated alternating (AC) voltage source and AC relay apparatus is combined with a test switch and a test resistance. The AC relay and the AC voltage source are connected by the test switch to the DC conductors so that low resistance across the conductors causes relaying of the AC relay apparatus. The test switch also switchably disconnects the AC source and relay apparatus from the conductors and couples them to the test resistance in substitution for the conductors. In this way the power control circuit tests the conductors for overload and also utilize the test resistance for demonstrating proper tripping action.

A method aspect of the invention for controlling the application of DC power to an electric vehicular system involves coupling a relatively low power AC source and AC relay means to the electric vehicular system. Next DC power is applied to the system unless the AC source trips and continues to trip the AC relay through the system. Then the DC power is monitored when applied to the system by simultaneously displayably metering the DC current and directly comparing the metering with a displayably adjustable indication of an overcurrent limit. The DC power is tripped out and the applying of the DC power is repeated (subject to an AC trip) only when the overcurrent limit is exceeded by the DC current so metered.

Another aspect of the invention involves preventing DC power from being applied when DC responsive relay means provided across the conductors detects DC voltage already across them. The invention also involves electric vehicular systems having three-phrase AC to DC power rectifier means, DC power carrying conductors adapted for use by an electric vehicle in such systems and having rectifier control apparatus of the type described hereinabove.

Other objects and features will be in part apparent and in part pointed out hereinafter.

BRIEF DESCRIPTION OF THE DRAWING

Corresponding reference characters indicate corresponding parts throughout the several views of the drawings.

DETAILED DESCRIPTION OF THE DRAWING

Figure 1:
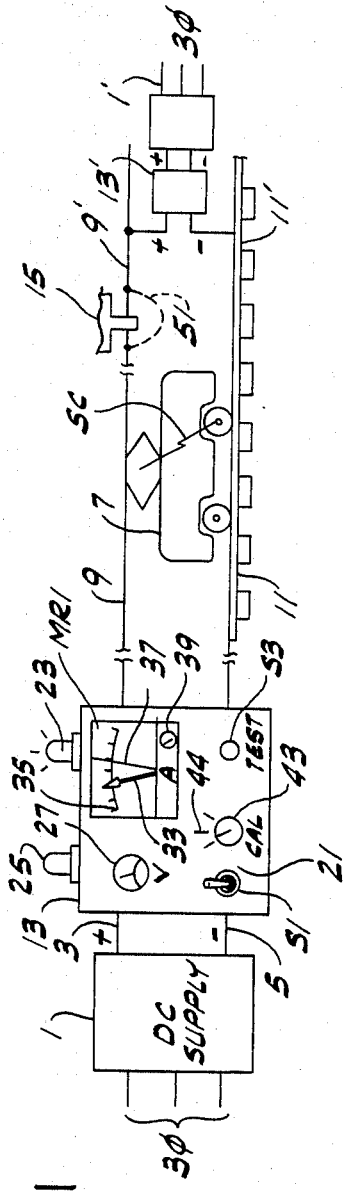
FIG. 1 shows a partially pictorial and partially block diagrammatic view of an electric vehicular system having DC power control according to the apparatus and methods of the invention.

Referring now to FIG. 1, full wave bridge rectifier DC power supply 1 is fed by three phase 3 phase high voltage alternating current at 12,470 volts. A transformer (not shown) in DC power supply 1 reduces the voltage to 220 volts, three phase, which is full wave rectified so as to produce 300 volt DC output shown on lines 3 and 5. Lines 3 and 5 are positive and negative conductors, respectively, for carrying DC current at sufficient power level for operating trolley 7, which in turn receives power from overhead trolley wire 9 and track 11 in a coal mine, for example. The application of DC power from power supply 1 to trolley conductors 9 and 11 is performed by control unit 13. The electric trolley system has 4,000-feet long track segments 11 and 11' and overhead trolley wire segments 9 and 9' and additional segments of approximately 4,000 feet of length, not shown, separated by means of deadblock 15 for the trolley wire, thereby to separate the system into manageable parts. Each segment is provided with its separate power supply 1' and control unit 13'.

Control unit 13 is illustratively shown having a panel 21 upon which the convenient operating and display devices for obtaining the advantages of the invention are located. "Close" light 23 when on indicates that power is being conducted from DC power source 1 to the track and trolley system 7, 9, 11. When close light 23 is off and "open" light 25 is on, the control unit 13 shows that power is disconnected from the trolley system 7, 9, 11 and the conductors are tripped out. Voltmeter 27 nominally indicates 300 volts being available from DC power supply 1, thereby indicating proper operation of said DC power supply 1 if it has been disconnected or tripped out from the rest of the system. The control unit 13 is switched on by means of power switch S1. When power is applied to the trolley system as indicated by light 23 being on, the current supplied is displayed on meter relay MR1. Meter relay MR1 has ammeter needle 33 registering on scale 35 and additionally has overload current needle 37 which is adjustable by means of knob 39. In use, the meter relay operates so as to give a continuous indication of the current which is being drawn by the trolley load or by some other loading which is being applied to the system. Control unit 13 continues to apply power to the load as long as meter needle 33 registers on scale 35 below the setting of overload needle 37. However, if an overload or a short circuit occurs, the current reading of needle 33 rises above the setting of overload needle 37. Then the meter relay MR1 operates so as to trip a DC power relay (R1 of FIG. 3) inside control unit 13, thereby disconnecting the DC power of power supply 1 from the trolley system 7, 9, 11.

The preferred embodiment also provides for a test switch button S3, which when pressed applies a low power DC voltage source to the meter relay and performs other AC and DC testing functions inside control unit 13. With the test switch S3 depressed and switch S1 then returned from off to on, a simulated overload prevents application of DC current, open light 25 is on, and close light 23 is off. With switch S3 released, close light 23 comes on and needle 33 reads actual applied current. Switch S3 is depressed again, and knob 43 is turned to a reference mark 44 for indicating 200 amperes, for example. Needle 33 should now read 200 amperes, if meter MR1 is properly calibrated. Next, knob 43 is turned so as to vary the meter needle 33 reading relative to the overload needle 37, thereby to simulate an overload or short circuit on the trolley system 7, 9, 11. When control unit 13 is operating properly, the DC power supply 1 is tripped out when the calibration knob 43 adjusts the meter relay needle 33 above the overload setting of needle 37. Close light 23 goes off and open light 25 goes on. Operation at variance with the foregoing simulation indicates malfunction in control unit 13. The unit 13 is self-calibrating and testable even by relatively unskilled personnel.

As before mentioned, additional power supplies 1' and control units 13' are provided for each segment of the track. Suppose now in a hazard scenario, that DC power supply 1 has malfunctioned and dead block 15 has been unauthorizedly circumvented by means of conductor 51. DC power supply 1 is repaired and power switch S1 is again turned on in control unit 13. A short circuit SC subsequently occurs intermediate rectifiers 1 and 1'. Both rectifiers feed the short, and the current loading divides between the rectifiers at levels insufficient to trip out either rectifier. Thus, an electrical shock hazard and a coal mine fire hazard are presented. To avoid the hazard, a protective circuit in control box 13 is provided for detecting the presence of voltage from power source 1' on the conductors 9 and 11 of the trolley system. This protective circuit includes a DC responsive relay which trips the main relay and prevents the application of DC power from power supply 1 until the conductors 51 and 53 are removed.

Figure 2:
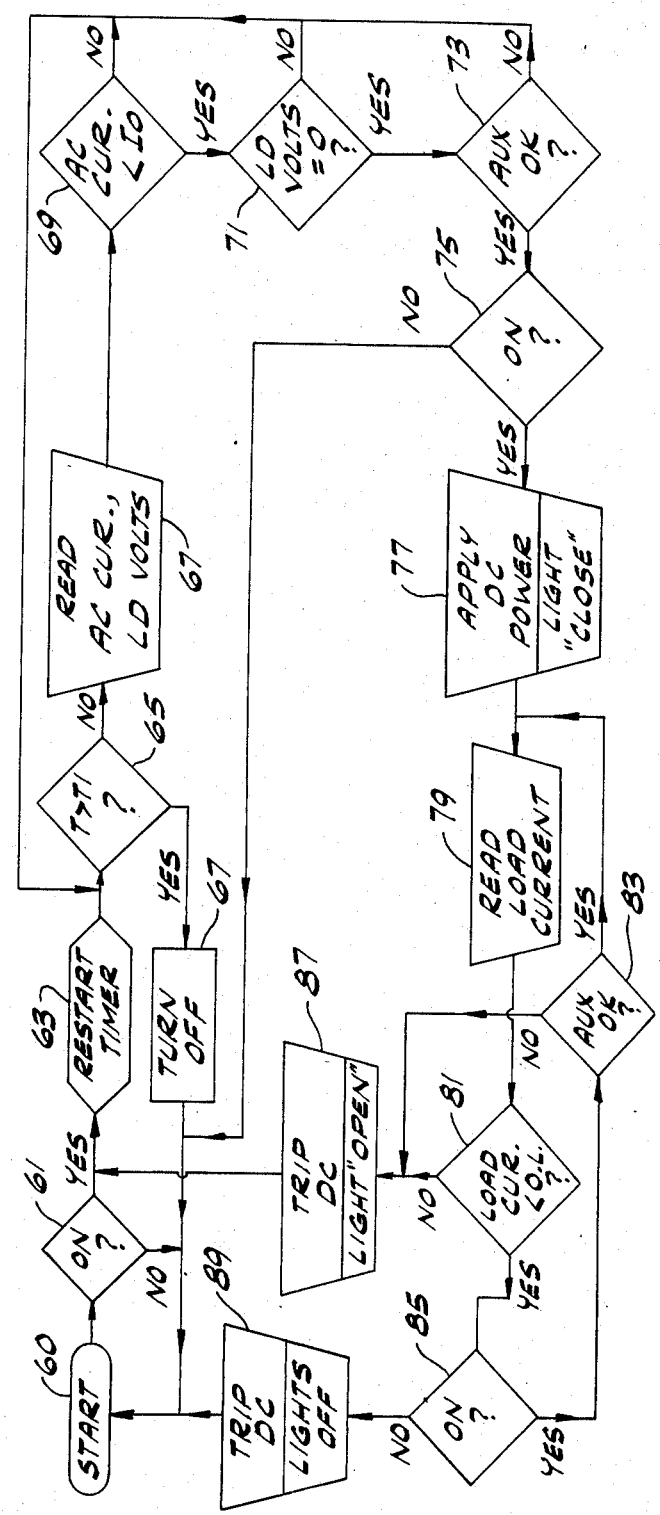
FIG. 2 is a flow chart illustrating a sequence of steps utilized in performing a method of the invention in the operation of the apparatus of the invention.

FIG. 2 shows a flow chart which is generally descriptive of the operations of control unit 13 in FIG. 1. The functions begin at START 60. If off-on switch S1 (FIG. 3) is on at step 61, then operations proceed to start a timer at step 63. Otherwise, operations remain at start 60 because switch S1 is off. When the timer has been started at step 63, it is checked to determine if a predetermined time interval T1, such as 10 seconds, has been exceeded at step 65. If so, the system turns off at step 67 and returns to start 60. If the time interval T1 at step 65 has not been exceeded, then the system at step 67 reads the AC test current (AC CUR.) which is preliminarily applied to the conductors 9 and 11 and also reads any load voltage (LD VOLTS) across the conductors 9 and 11. If at branch 69 the AC test current exceeds a predetermined level $I_o$, such as might result from an overload or a short circuit between conductors 9 and 11, then the operation loops back to step 65 for the time check. AC current and load voltage is again read at step 67, and the AC current test is again performed at step 69. If the overload or short circuit persists in excess of the predetermined time period at step 65, then the control unit 13 will turn off at step 67. However, if the AC test current falls below an excessive amount, then the steps proceed to branch on the presence of an unauthorized voltage across the trolley wires 9 and 11 at step 71. If an unauthorized voltage does exist, then operations will loop back to time checking 65 and, if necessary, turn off 67. Otherwise, if both steps 69 and 71 are passed, and if there are no auxiliary (overtemperature, etc.) problems at branch 73, then operations proceed.

If the switch S1 is on at step 75, then DC power is applied from DC power supply 1 to the track trolley system 7, 9, 11 in the step 77. Also, the close light 23 is turned on. At this point DC power from power supply 1 has been applied to the track trolley system 7, 9, 11 and the system is used normally. At step 79, the load current passing through the conductors is read and monitored by the meter relay MR1. If at step 81 the load current is less than the predetermined system overload setting, as of needle 37 of meter relay MR1, then control unit 13 checks to make sure that auxiliary conditions are all right at step 83 and that the on/off switch S1 is still on at step 85. Then the load current continues to be read, the tests 81, 83, 85 continue to be made, and DC power continues.

However, if the load current exceeds the overload limit 37 at branch 81 or auxiliary problems arise at branch 83, then the DC current is tripped and the open light 25 is lighted at step 87. Operations then return to step 63 where the timer is restarted. During a period of nominally 10 seconds from the restart, tests 69, 71, 73 are made and if the problem is removed within that period of time, DC power is again applied at step 77. Otherwise the system is turned off at step 67. When power switch S1 is turned off during a condition of DC current on the trolley 7, then at step 85 the operations branch to step 89, where the DC is tripped, all lights are turned off, and start 60 is reached once again.

Figure 3:
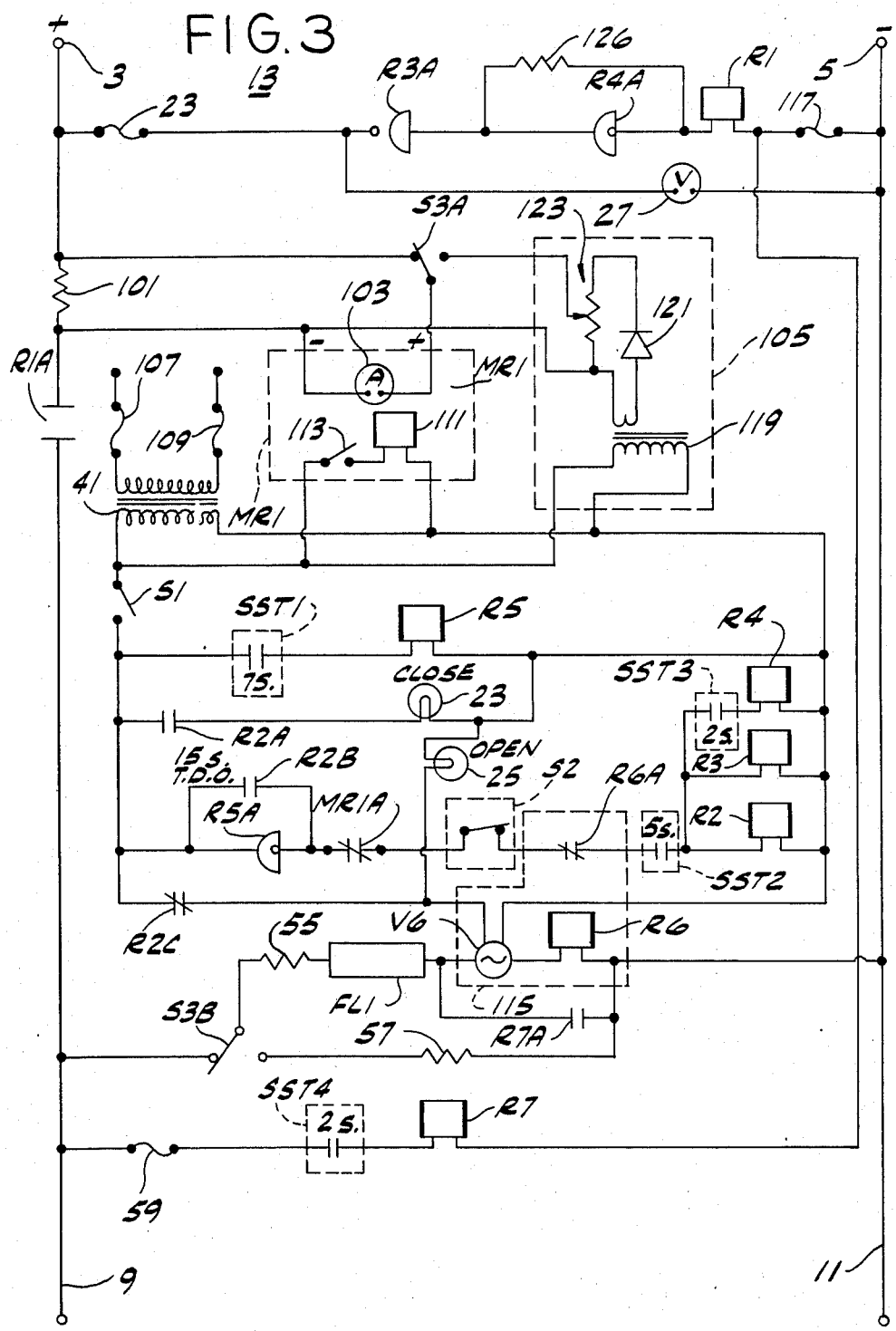
FIG. 3 is an electrical schematic diagram of a preferred embodiment of a rectifier control circuit subcombination of the invention.

Referring now to FIG. 3, it is first noted that conductors 3 and 5 at the top of the diagram are connected to DC power supply 1 of FIG. 1 and conductors 9 and 11 at the bottom of FIG. 3 correspond to those of FIG. 1 in the track trolley system. Some of the major components of the circuit of FIG. 3 are the DC main power relay R1 having main power DC interrupt contacts R1A, meter relay MR1 with its meter shunt resistance 101, a combination AC power source V6 and AC relay R6 in AC testing unit 115, test switch S3 having double-pole-double-throw (DPDT) sections S3A and S3B, DC test source 105 having calibrating knob 43 of FIG. 1, and protective DC responsive relay R7.

Standard schematic symbols are used as much as possible. Normally open contacts are shown as parallel lines. Normally closed contacts additionally have a diagonal line. Mercury contacts are shown having a circular sector. The sector is drawn separate to indicate normally open contacts, and drawn contacting to indicate normally closed contacts. Solid state time switches SST1, SST2, SST3 and SST4 are drawn schematically as normally open contacts surrounded by dashes. They are solid state two terminal electronic switches which effectively close in a preset period of time after voltage is applied across the terminals and which open when voltage is removed.

The operational sequence of the FIG. 3 circuit of control unit 13 is next described. With the on/off switch S1 off, DC voltage from conductors 3 and 5 initially rests on the R3A normally open mercury relay contacts. Also, DC voltage rests on the R1A normally open contactor of the DC main power relay R1 which applies DC power or trips it out. The ammeter 103 portion of meter relay MR1 is coupled through test switch S3A across meter shunt resistor 101. Voltmeter 27 is energized through fuse 23 between the positive and negative conductors 3 and 5 from the power supply at all times. 110 volt 60 Hz power voltage rests on on/off switch S1 through transformer 41, which is isolated by fuses 107 and 109 from a power main or supply not shown.

When on/off switch S1 is closed, transformer 41 voltage rests on 7 second solid state timer SST1 and on the normally open contacts R2A of relay R2. The transformer voltage is conducted through the normally closed mercury contacts R5A of relay R5, through the normally closed MR1A contacts of the meter relay MR1, through the auxiliary protect switch contacts S2, and through the normally closed contacts R6A of the AC relay R6. Then the transformer voltage rests on the 5 second solid state timer SST2. The transformer 41 voltage also is conducted through the normally closed contacts R2C of relay R2 and lights "open" light 25. Also, the transformer voltage is conducted through the normally closed contacts R2C to provide power to and energize the AC source V6 in the AC testing circuit 115 for the trolley conductors 9 and 11.

In the preferred embodiment AC source V6 provides a 4,000 Hz. signal which is DC isolated from conductors 9 and 11 by filter FL1. The AC source V6 is connected in series with AC relay coil R6, with filter FL1, with 5-ohm series resistor 55 and test switch section S3B, and across conductors 9 and 11, so that a low resistance such as a short across the conductors, causes relaying of the AC relay R6. In turn, the AC relay R6 is able to prevent any DC power applying step by relay R1 from occurring when the AC source V6 trips and continues to trip relay R6 through the vehicular system 9, 11 for a time period in excess of the 7 second delay of SST1. Components V6, R6, FL1, and 55 are selected so that the 4,000 Hz. signal circuit does not actuate the relay R6 through the normal resistance of trolley 7 between track 11 and trolley wire 9.

If the track trolley system 7, 9, 11 has power on it by another rectifier 1' of FIG. 1, prior to closing relay R1, then time switch SST4 closes after 2 seconds and fuse-59-protected relay R7 completes the 4,000 Hz signal circuit through contacts R7A. Relay R6 contacts R6A open, preventing closure of relays R3 and R1. In this way, the rectifier 1 is prevented from access to the conductors 9, 11 and hazardous paralleling of two power supplies 1 and 1' is prevented.

If the track does not have a short circuit, or voltage on already, contacts R6A remain closed and the normally open solid state time switch SST2 closes after a 5 second delay. Solid state time switch SST2 with relay R2 constitute timed control means first permitting for a 5 second predetermined time period DC testing by relay R7 and energization of the AC voltage source V6 and secondly then deenergizing source V6 and disabling DC test relay R7 and subsequently by relay R3 causing the DC power relay R1 to apply the DC current from the power supply 1 to the load 7, 9, 11 unless the AC relay R6 has been able to cause tripping. Thus, the AC relay R6 and the DC responsive relay R7 operate so that the AC source V6 and AC relay R7 are functioningly exposed to the conductors 9, 11 during a first 5 second (SST2) time period, te DC power being applied to the conductors after the time period unless relaying occurs by at least one of the AC relay R6 and the DC responsive relay R7 during the time period. The solid state time switch SST2 also cooperates with the other timed devices R2B, SST1, and R5 to control DC testing by relay R7 and AC relaying at relay R6 during the DC current reapplication process if and when tripping has occurred after DC power has been on through contacts R1A.

With SST2 on, transformer 41 voltage energizes relay R2 and relay R3, and voltage rests on 2 second solid state timer SST3. Because relay R2 is energized, contacts R2A turn on "close" light 23. Also, contacts R2B (which are instant close, 15 second timed delay open) close to parallel the mercury contacts R5A. Then the normally closed contact R2C opens, removing power from "open" light 25 and from the AC signal source V6, thereby terminating the AC current test.

With relay R3 energized, DC voltage passes through mercury normally open contact R3A and normally closed mercury contact R4A to immediately energize relay coil R1 through fuse 117. Relay R1 closes main DC contacts R1A, putting 300 volt DC power voltage onto trolley system lines 9 and 11. DC power voltage now rests on DC isolating filter FL1 and solid state timer SST4, which has a 2 second time delay. Solid state timer SST1 now closes, energizing relay R5, opening the normally closed contacts R5A, and permitting a timing function to go into effect due to contacts R2B if relay R1A is later tripped. Solid state timer SST3 also closes, energizing relay R4, thereby opening the contacts R4A and limiting the current by means of resistor 126 to a merely adequate value to maintain the main DC power relay R1 closed. Solid state timer SST4, with a delay of 2 seconds having elapsed, also closes relay R7 but there is no effect because AC source V6 has been deenergized.

After the main relay contacts R1A are closed and 300 volts DC power has been established on the track trolley system, suppose a short circuit or excessive current load exceeding the allowable current limit preestablished and preset on the meter relay MR1, needle 37, occurs. Meter relay MR1 is monitoring the DC power when applied to the system 7, 9, 11 by simultaneously displayably metering the DC current and directly comparing its metering with the displayable indication on needle 37 of an overcurrent limit. Meter relay MR1 needle circuit 113 closes, energizing relay 111, opening the normally closed relay contacts MR1A, and removing power from relays R2, R3 and R4. Contacts R3A open, turning off relay R1, and opening the DC power relay contacts R1A, thus tripping the DC current on conductor 9. With power now removed from the track trolley system, the excessive current can no longer exist, the meter relay contacts MR1A close again, and the whole process of applying the DC current subject to the AC and DC tests is repeated.

If the short circuit that caused the excessive current still exists, the AC signal source V6 (being now energized by the normally closed R2C relay contacts), completes a path through the short and energizes relay R6, opening the normally closed contacts R6A. Contacts R6A remain open until the short circuit is cleared, ensuring that the contacts R1A do not reclose under this condition. Contacts R2A and R2C also operate the open light 25 and close light 23 so that the progress of reclosure is always evident.

The contacts R2B, it will be recalled, are provided with a predetermined opening time delay of approximately 15 seconds. These contacts will open and lockout relays R2, R3 and R4 after 15 seconds of sustained power loss to relay R2, due to a sustained short circuit SC. If lockout occurs, the R1A contacts cannot be closed until the short circuit is corrected and the on/off switch S1 is manually turned from on to off and then back to on. This is because resetting switch S1 resets the relay R5 normally closed contacts R5A subject to the 7 second delay period of solid state timer SST1.

If the short circuit or overload be cleared within about 10 seconds after power loss, then solid state timer SST2 is reenergized in time to repower relays R2, R3 and R4 and thus reclose relay R1 contacts R1A before the 15 second-delay-opening relay contacts R2B can lock out the circuitry. Because of the 5 second delay of solid state timer SST2, the longest period before lockout during which the short circuit can be cleared, is 15 seconds (R2B) minus 5 seconds (SST2), or 10 seconds.

Solid state switches SST1 and SST2 with the relays R2 and R5 constitute timed control means automatically operating so as to permit operation of the AC voltage source V6 and the AC relay R6 through the DC conductors 9 and 11 only during a first predetermined time period of 5 seconds (SST2) and then to cause the DC current to be applied in the DC power system 7, 9, 11 unless relaying of AC relay R6 occurs, the timed control means permitting reapplication of the DC current only within a second predetermined time period of 10 seconds (SST1 on, R5A open, R2B 15 second time delay open, less SST2 5 seconds) subsequent to tripping out of the DC current in response to meter relay MR1.

Suppose that a power interruption to the transformer 41 occurs when the track trolley system 7, 9, 11 has been energized and the on/off switch S1 is on. Then the same sequence of operation of control unit 13, as has been earlier explained, prevails immediately upon restoration of the power to the transformer 41. The circuitry will retest the trolley conductors 9, 11 and proceed to reclose the power relay contacts R1A.

Overload and reclosure protection testing can be readily accomplished in the circuit of FIG. 3 simply by pressing the double-pole-double-throw (DPDT) spring loaded push button test switch S3A, S3B. Pushing the test switch S3 button disconnects meter relay MR1 from meter shunt resistor 101 and substitutes the adjustable voltage of the DC test source 105. DC test source 105 consists, for example, of step down transformer 119, having 6.3 volts output which is rectified by diode 121 and applied to voltage divider potentiometer 123 to which knob 43 (FIG. 1) is attached. The variable range available from the DC test source potentiometer 123 makes it possible to simulate the output of meter shunt resistor 101. Adjusting the voltage potentiometer 123 to provide current into ammeter portion 103 of meter relay MR1 in excess of the overcurrent limit on needle 37 causes the meter relay MR1 to open its normally closed contacts MR1A and remove power from the track trolley system. If at this time the test switch S3 button is released, and the simulated overcurrent condition is removed, the meter relay MR1 normally closed contacts MR1A reclose. Power now rests on solid state timer SST2 and after its 5 second delay, power is applied to relay R3 to close the DC power relay R1, restoring DC power through contacts R1A to the track trolley conductors 9 and 11.

If the test switch S3 button be maintained depressed in the test position after simulated overcurrent has caused the relay contacts MR1A to open and then the output of the DC test source at potentiometer 123 is lowered below the overcurrent level, then the relay contacts MR1A will reclose. However, the circuitry of the invention will still in this simulated condition not allow DC power to be restored. This is because AC source V6 is coupled by switch section S3B through filter FL1 and resistor 55 to the substitutional test resistance 57, being of a low 1 ohm nominal value. Resistor 57, being 1 ohm, simulates a 300 amp draw by conductors 9, 11. In this way tripping capability in the AC test is demonstrated. When the test switch is maintained for 10 seconds, the system will lock out. Then after release of the test switch S3 button the on/off switch must be reset from off to on in order to restore power and normal control to the track trolley system 7, 9, 11.

In the preferred embodiment, the meter relay MR1 is suitably a Simpson meter relay model 3324, spec.: D16889. The meter relay has a faceplate modified to read 0-to-2000 amperes. The shunt resistor 101 is a 2,000 amp 50 millivolt unit. The DC test source 105 is a 50 millivolt adjustable power supply. The filter is a Femco high pass filter F12559, which is DC isolated by means of a capacitance either built into the unit or added in series. Relay R2 is a Square-D type: BO-2D Class 9050.

Relay R3 is Magnecraft WH50A-120A and relays R4 and R5 are Magnecraft H50B-120A. The DC responsive relay R7 for testing the trolley conductors 9, 11 is a Magnecraft WH50A-250-D. Solid state timers SST1, SST2, SST3 are all Artisan model 438USA. Solid state timer SST4 is an A.M.R. ST1300 model. The AC source V6 and relay R6 are suitably combined in an appropriate unit such as the Femco GM 1000 and filter FL1 is a Femco high pass filter for passing 4,000 Hz. Relay R1 and the resistance 126 are selected to suit the rectifier power supply 1 voltage and current specifications. The auxiliary protecting switch S2 is of any suitable type triggered by overtemperature and/or other sensors in power supply 1.

It will be understood that the meter relay MR1 is of any suitable type. The circuitry 103, 111, 113 in FIG. 3 inside meter relay MR1 is illustrative, and actual meter relays can involve optocouplers and other circuits of relative complexity. Test switch sections S3A and S3B are alternatively implemented as separate switches on the panel of control unit 13.

The AC source V6 and AC relay R6 are also illustrative of more complex AC testing means. The use of AC is chosen in the preferred embodiment in that DC isolation is inexpensively accomplished. Thus, when the DC power is on conductors 9, 11 there is no adverse affect on AC unit 115. The frequency of AC source V6 is not critical, and it is chosen at any convenient value which is inexpensively obtainable and DC isolatable. The frequency source V6 is alternatively a mere 60 Hz transformer and filter FL1 a series capacitor.

If conductor 9 includes a large manual knife switch (not shown) with a microswitch attachment, the latter microswitch is suitably wired in series with the auxiliary protector switch S2. Overtemperature protection can be provided for transformers and for diodes in the DC power supply 1 to actuate the auxiliary protection switch S2.

All the switches and relays described in FIG. 3 are also suitably provided in electronic solid state circuitry form. Many different electric and electronic circuits can be designed which operate according to the inventive methods. The predeterrmined time periods are made longer or shorter as convenience dictates. With reference to FIG. 2, the flow chart is appropriately used by the skilled worker to prepare a program for any suitable available microprocessor to accomplish microprocessor timing and control of a DC power system. Accordingly, many DC power systems are able to be devised by the person skilled in the art according to the invention by reference to the disclosure herein, so that the utility of the invention can be fully realized.

As various changes could be made in the above constructions and methods without departing from the scope of the invention, it is intended that all matter contained in the above description or shown in the accompanying drawings shall be interpreted as illustrative and not in a limiting sense.

What is claimed is:

1. In a direct current (DC) power system having conductors for carrying a DC current and means for tripping out said DC current, control apparatus comprising:
    meter relay means coupled in shunt to one of said conductors for displayably measuring said DC current and comprising adjustable means for establishing an overcurrent limit and relaying when said limit is exceeded;
    said means for tripping out said DC current responding to said relaying when said limit is exceeded;
    adjustable DC relatively low power test source means; and
    test switch means for switchably decoupling said meter relay means from said one conductor and connecting said meter relay means to said adjustable test source means, said test source means being sufficiently adjustable to cause said meter relay means to display both above and below said overcurrent limit;
    whereby said control apparatus directly monitors said DC current in said one conductor and is testable by said test switch means with said adjustable test source means for tripping action at said overcurrent limit of said meter relay means.

2. Control apparatus as claimed in claim 1 wherein said control apparatus further comprises:
    alternating (AC) voltage source means and AC relay means and test resistance means;
    said AC voltage source means and said AC relay means being coupled through said test switch means to said DC conductors so that a low resistance across said conductors causes relaying of said AC relay means, said AC relay means being able to cause tripping of said DC current;
    said test switch means also being able to switchably disconnect said AC relay means and said AC voltage source means from said conductors and couple said test resistance in substitution for said conductors,
    whereby said control apparatus is able to test said conductors for overloads and short circuits and also utilizes said test resistance to demonstrate tripping capability.

3. Control apparatus as claimed in claim 1 wherein said control apparatus further comprises:
    DC responsive relay means provided across said conductors, said DC responsive relay means preventing flow of said DC current from said DC power system when said DC responsive relay means detects a DC voltage already across said conductors.

4. Control apparatus as claimed in claim 3 wherein said control apparatus further comprises:
    timed control means;
    alternating (AC) voltage source means and AC relay means;
    said AC voltage source means and said AC relay means being DC isolated and being coupled through said test switch means to said DC conductors so that a low resistance across said conductors causes relaying of said AC relay means, said AC relay means being able to cause tripping of said DC current;
    said timed control means automatically operating so as to permit operation of said AC voltage source means and said AC relay means through said DC conductors only during a first predetermined time period and then to cause said DC current to be applied in said DC power system unless relaying of said AC relay means occurs;
    said timed control means permitting reapplication of said DC current only within a second predetermined time period subsequent to tripping out of said DC current in response to said meter relay means.

5. In a DC power system having a rectifier power supply, a load, and positive and negative conductors for carrying DC current from the power supply to the load, a rectifier control system comprising:

alternating (AC) voltage source means and AC relay means;

test switch means and test resistance means;

said AC voltage source means and said AC relay means being coupled through said test switch means to said DC conductors so that a low resistance across said conductors causes relaying of said AC relay means, said AC relay means being able to cause tripping of at least one of said conductors;

said test switch means also being able to switchably disconnect said AC relay means and said AC voltage source means from said conductors and couple said test resistance in substitution for said conductors, whereby said control system is able to test said conductors for overloads and short circuits and also utilizes said test resistance to demonstrate tripping capability.

6. The rectifier control system claimed in claim 5 wherein said rectifier control system further comprises DC isolation means connected so as to DC isolate said AC voltage source means and said AC relay means from said DC conductors.

7. The rectifier control system claimed in claim 5 wherein said rectifier control system further comprises:

timed control means; and

DC power relay means;

said timed control means permitting for a predetermined time period energization of said AC voltage source means and then subsequently deenergizing said AC voltage source means and causing said DC power relay means to apply said DC current from the power supply to the load unless said AC relay means has been able to cause tripping.

8. The rectifier control system claimed in claim 7 wherein said rectifier control system further comprises:

means for tripping said DC current when an overcurrent limit of said DC current is exceeded in at least one of said positive and negative conductors;

reapplication of said DC current to said positive and negative conductors occurring, when tripping occurs, through said DC power relay means unless said AC source relays and continues to relay said AC relay means, said reapplication of said DC current only being permitted by said timed control means during a second predetermined time period.

9. The rectifier control system claimed in claim 8 wherein said means for tripping out said DC current comprises:

meter relay means coupled in shunt to one of said conductors and displayably measuring said DC current and including adjustable means for establishing an excess current limit and causing said DC power relay means to trip at least one of said conductors when said excess current limit is exceeded; and adjustable DC relatively low power test source means;

said test switch means also being able to switchably decouple said meter relay means from said one conductor and connect said meter relay means to said adjustable test source means, said adjustable means for establishing an excess current limit being sufficiently adjustable to cause said meter relay means to demonstrate tripping action at a level of current provided by said adjustable test source means.

10. A method for controlling the application of direct current (DC) power to an electric vehicular system comprising the steps of:

coupling a relatively low power alternating current (AC) source and AC relay means to said electric vehicular system;

applying said DC power to said electric vehicular system unless said AC source trips and continues to trip said AC relay means through said electric vehicular system;

monitoring said DC power when applied to said electric vehicular system by simultaneously displayably metering the DC current and directly comparing said metering with a displayably adjustable indication of an overcurrent limit; and tripping out said DC power and repeating said applying step only when said overcurrent limit is exceeded by said DC current so metered.

11. The method for controlling the application of DC power to an electric vehicular system and being as claimed in claim 10 wherein said method further comprises the step of:

providing DC responsive relay means across said electric vehicular system; and preventing said DC power applying step from occurring when said DC responsive relay means detects DC voltage already across said electric vehicular system.

12. The method for controlling the application of DC power to an electric vehicular system and being as claimed in claim 10 wherein said method further comprises the step of preventing said DC power applying step from occurring when said AC source trips and continues to trip said AC relay means through said electric vehicular system for a time period in excess of a predetermined time period.

13. An electric vehicular system comprising:

three-phase AC to DC power rectifier means;

DC power carrying conductors adapted for use by an electric vehicle in said system; and rectifier control apparatus comprising:

power relay means for applying DC power to said DC power carrying conductors;

meter relay means coupled in shunt to one of said conductors for displayably measuring said DC current and comprising adjustable means for establishing an overcurrent limit and relaying when said limit is exceeded;

alternating (AC) voltage source means and AC relay means;

said AC voltage source means and said AC relay means being coupled with DC isolation to said DC conductors so that a low resistance across said conductors causes relaying of said AC relay means; and DC responsive relay means connected across said DC power conductors;

said DC power being applied to said conductors unless relaying occurs by at least one of said meter relay means, said AC relay means, and said DC responsive relay means.

14. The electric vehicular system claimed in claim 13 wherein said electric vehicular system rectifier control apparatus further comprises adjustable DC relatively low power test source means, test resistance means and test switch means, said test switch means switchably decoupling said meter relay means from said one of said conductors and connecting said meter relay means to said adjustable test source means, said test source means being sufficiently adjustable to cause said meter relay means to display both above and below said overcurrent limit whereby said rectifier control apparatus is testable by said test switch means with said adjustable test source means for proper tripping action at said overcurrent limit of said meter relay means; and said test switch means also being able to switchably disconnect said AC relay means and said AC voltage source means from said conductors and couple said test resistance means in substitution for said conductors whereby said control system is able to test said conductors for overloads and short circuits and also utilizes said test resistance to demonstrate tripping capability.

15. The electric vehicular system claimed in claim 13 wherein said rectifier control apparatus further comprises means for timed control of said AC source means, said AC relay means and said DC responsive relay means operating so that said AC source and AC relay means are functioningly exposed to said conductors during a predetermined time period, said DC power being applied to said conductors after said predetermined time period unless relaying occurs by at least one of said AC relay means and said DC responsive relay means during said predetermined time period.

* * * * *